Feb. 29, 1972   J. M. WINNICK   3,646,180
METHOD OF FORMING A FOAM CORED WALL PANEL,
HAVING CERAMIC TILE ON ONE FACE
Filed Oct. 24, 1969   2 Sheets-Sheet 1

JACK M. WINNICK
INVENTOR.

BY R. E. Beaugue
ATTORNEY

JACK M. WINNICK
INVENTOR.

BY R.E. Geaugue
ATTORNEY

United States Patent Office 3,646,180
Patented Feb. 29, 1972

3,646,180
METHOD OF FORMING A FOAM CORED WALL PANEL HAVING CERAMIC TILE ON ONE FACE
Jack M. Winnick, Anaheim, Calif., assignor to Selectile Company, Inc., Los Angeles, Calif.
Filed Oct. 24, 1969, Ser. No. 869,168
Int. Cl. B29d 27/04
U.S. Cl. 264—45
6 Claims

ABSTRACT OF THE DISCLOSURE

Method of forming a modular wall panel is disclosed herein having a central core composed of a foam plastic material with a layer of ceramic tiles secured to one surface of the core and a fiber reinforced polyester resin backing layer secured to the other side surface of the core. The abutment joints of the tiles formed by opposing and adjacent edges of the tiles are sealed by strips of adhesive tape and a thin intermediate layer of fiber reinforced polyester resin is disposed between the tape contacting side of the tiles and the core. Securement means for mounting the panel to building structure are incorporated into the fiber reinforced polyester resin backing layer.

BACKGROUND OF THE INVENTION (1) Field of the invention

This invention relates to modular building panels and is particularly directed to a wall panel and method of manufacture therefor which is useful in prefabricated building structures.

(2) Brief description of the prior art

In nearly every climate on the earth, man must build shelter from the elements and for the further purpose of providing privacy for man and his goods. This shelter is to protect man and his goods from various weather conditions, from rain and snow, temperature extremes and wind. There is a tremendously increased interest, at the the present time, in the field of modular building construction wherein individual wall panels are placed adjacent each other in an end-to-end relationship and which are suitably secured together so as to quickly and economically create an enclosure. These enclosures are useful for homes, offices, factories, storage and public buildings. Furthermore, there has been a long standing need to employ such wall panels for interior building purposes and particularly in those construction areas not intended nor requiring load-bearing capability.

In the past, conventional building structures have required a tremendous amount of handwork and individual skill, so that the cost thereof has risen in proportion to the cost of employment of the skilled labor. In order to reduce the cost of such structures, considerable interest is being shown in buildings and particularly portions thereof which are made of prefabricated panels that may be assembled at the site of the building to create internal wall structures incorporated into the building. One of the problems of such pre-fabrication is the proper closure of the panel joints and maintaining of appearance and structural integrity under adverse conditions such as exposure to moisture, heat and other climatological conditions. Furthermore, the efficiency resulting from modular building construction wherein the building either exteriorly or interiorly, is made of panels of predetermined size and shape depends primarily upon the proper securement of the panels in proper relationship to each other so that the enclosure structure can both be quickly assembled and when assembled forms a rigid unitary structure.

Accordingly, the present invention is directed to a novel wall panel construction which is arranged or capable of being arranged so that the panels are locked to adjacent pre-fabricated wall panels so as to maintain them in associated relationship. The novel panel comprises a central core of plastic foamed-in-place material having a front side surface covered in a plurality of decorative ceramic tile facings and a back side surface covered by a layer of fiber glass. The tiles are held together during manufactturing in a mold by a plurality of adhesive strips disposed to as to seal the cracks or joints defined by the abutment of opposing tile edges. Mounting means are carried on the back fiber glass layer for anchoring or securing the individual wall panels to conventional construction of the building such as to wall studs or other load bearing building members.

Means are also provided for sealing and retaining together the joints between pre-fabricated building panels to handle excessive water and moisture conditions. The pre-fabricated wall panels are made of indigenous material and are framed with a frame structure which extends around the edges thereof. The frame structure has facing edge surfaces which abut each other when two panels are put in edgewise association, through which fasteners such as nails may be installed to temporarily hold the panels in place against conventional wall studs.

Therefore, it is a primary object of the present invention to provide a wall panel construction which is particularly suitable for modular building constructions employing pre-fabricated building panels.

It is another object of the present invention to provide a novel wall panel which may be intergaged with adjacent modular wall panelling to firmly hold the panels in associated relationship.

Another object of the present invention is to provide a novel wall panel construction which can be fabricated on a mass production basis employing a series of novel manufacturing steps.

Yet another object of the present invention is to provide a novel wall panel having a central core of foam plastic with a front facing of ceramic tiles and a rear or back facing of fiber glass which provides improved characteristics involving heat resistance and a high strength to weight ratio.

It is still a further object of the present invention to provide means for aiding in the retention of the adjacent wall panels together and which seal the joints formed by adjacent wall panels against adverse environmental conditions of air or moisture.

It is another object of the present invention to provide means for anchoring or securing individual wall panels to load-bearing structure of the building so that loads encountered in the individual wall panels may be spread to adjacent structures.

BRIEF DESCRIPTION OF THE DRAWINGS

The features of the present invention which are believed to be novel are set forth with particularity in the appended claims. The present invention as to its organization and manner of operation, together with further objects and advantages thereof, may best be understood by reference to the following description, taken in connection with the accompanying drawings, in which:

DESCRIPTION OF PREFERRED EMBODIMENT

Figure 1:
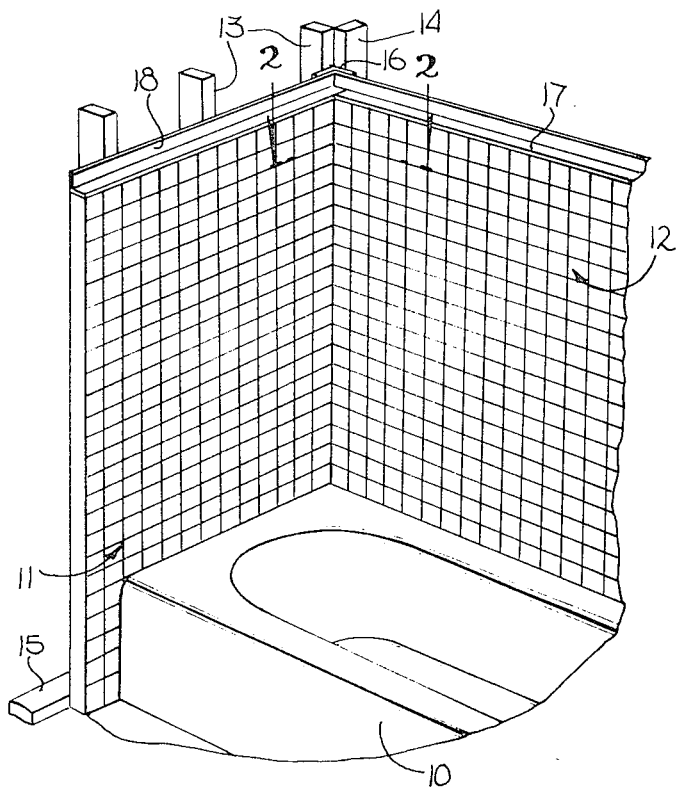
FIG. 1 is a perspective view of a building construction employing novel wall panels in accordance with the present invention for the purpose of a bathing enclosure.

Referring now to FIG. 1, the wall panel construction of the present invention is shown in an application for enclosing a bathtub indicated in the general direction of numeral 10. The wall panels employed in this application are internal walls which are not intended to be load bearing members and it is further to be understood that although a bathtub 10 is shown, the wall panels of the present invention may be suitably employed in other enclosure applications such as for showers, closets, utility rooms and the like.

Wall panels 11 and 12 adjoin each other on a common edge to form a butt joint. As illustrated, the wall panels are disposed on one side of conventional building framing as is indicated by studs 13 and 14 and baseboard 15. The joint is sealed by means of a fiber glass corner piece or flashing 16 which extends from the top of the wall panel construction to the upper surface of the tub 10. A pocket or slot is pre-formed by joining a flange section 16a, shown in FIG. 2, of the corner 16 with one of the wall panels, such as panel 12, so that the pocket or slot is formed between the flange 16b of the corner and the end of panel 12. Thereby, the end of wall panel 11 can be inserted into the pocket so formed to make joint therewith. Preferably, the inside of the corner pocket is coated with a resin-cement compound to provide further assurance of a waterproof joint and to bond the two panels to the corner piece and to each other. By such means, any moisture or water which may seep between the adjacent wall panel ends, will be returned to the tub via the cornerpiece. Furthermore, the composition of the cornerpiece being of plastic suitably protects the building studs against moisture damage which would normally fatigue or rot the studs. The butt joint formed by the common edges of the panels in combination with the corner flashing piece permit deflections between the panels which may cause a slight crack therebetween; however, the flashing piece adequately handles any water problem so that deflections between panels do not adversely affect the enclosure structure.

Figure 2:
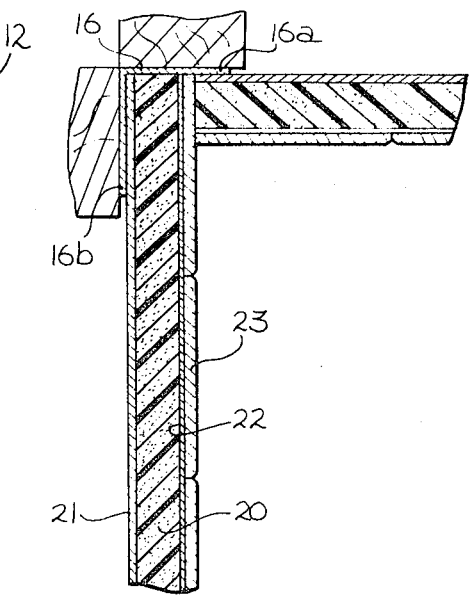
FIG. 2 is an enlarged sectional view of the wall panel construction illustrated in FIG. 1 as taken in the direction of arrows 2—2 thereof.

Referring to FIG. 2, a cross sectional view of the wall panels employed in the present invention are illustrated which show that each wall panel includes a centrally disposed core 20 composed of a suitable polyurethane, polyethylene or a polystyrene foam composition or the like. On one or back side of the core, there is provided a fiber glass board or layer 21 which is laminated or bonded to the foam core. On the opposite side of the core from its side adhered to the board 21, there is applied thereto a layer of integrated ceramic tiles as indicated by numeral 23. The tile layer is secured to the foam core by a layer 22 of fiber glass and may be individual ceramic tile facings which have been disposed with respect to each other to form an integral sheet. The tiles are secured to the surface of the core mtaerial by suitable adhesive epoxy setting agents such as polyester resins included in the layer 22.

Extending around the exposed edges of each panel there is provided a top cap 17 which can be of a plastic or aluminum extrusion. This gives a suitable finished effect to the panels. The fiber glass board 21 on the back of each panel is designed to leave a flange 18 around the exposed areas of the panels. These flanges also act as an attachment strip or device permitting nails to be driven therethrough into the studs. This allows the surface covering dry wall hard board or plaster to be filled on cap 17 covering flange 18 to complete the wall surfaces in the room.

In the construction of a wall panel enclosure for the tub 10, it is to be understood that a wall panel similar to the panel 11 is provided on the opposite end of the tub which also forms a butt and sealed joint with the opposite end of wall panel 12. Such construction then permits an end wall panel to be positioned against the building studs followed by the installation of the side panel 12 to form the butt joint with the end panel 12 and then the final installation of the end panel 11 to form the butt joint shown in FIG. 1.

Figure 3:
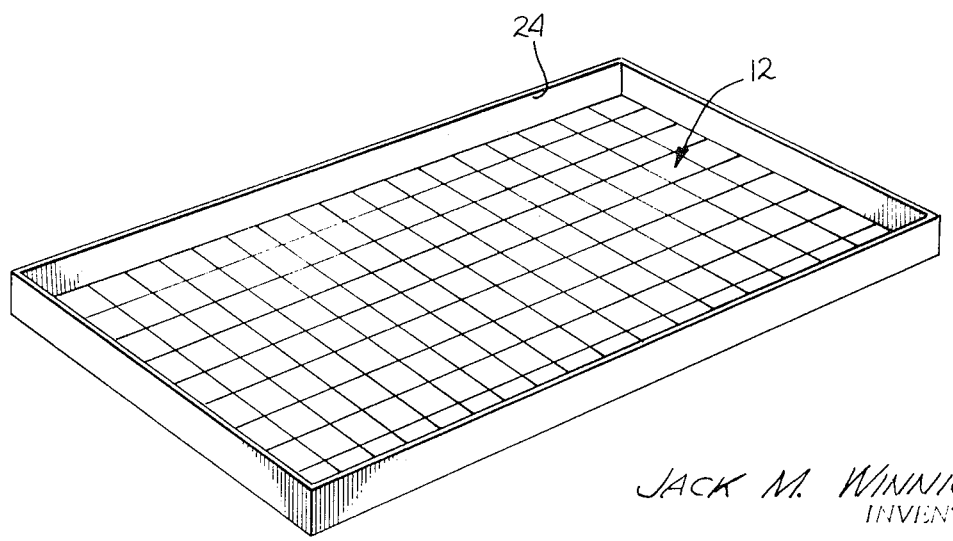
FIG. 3 is a perspective view of a mold having an arrangement of tiles placed therein preparatory to fabrication of a wall panel.

Preferably, the wall panel of the present invention is manufactured by first placing the tile squares face down in a rectangular mold or form 24 as shown in FIG. 3. The upright sidewalls of the mold define a fabrication cavity with the backside of the tiles serving as a bottom upon which the other parts and components of the panel may be laid in a predetermined order.

Figure 4:
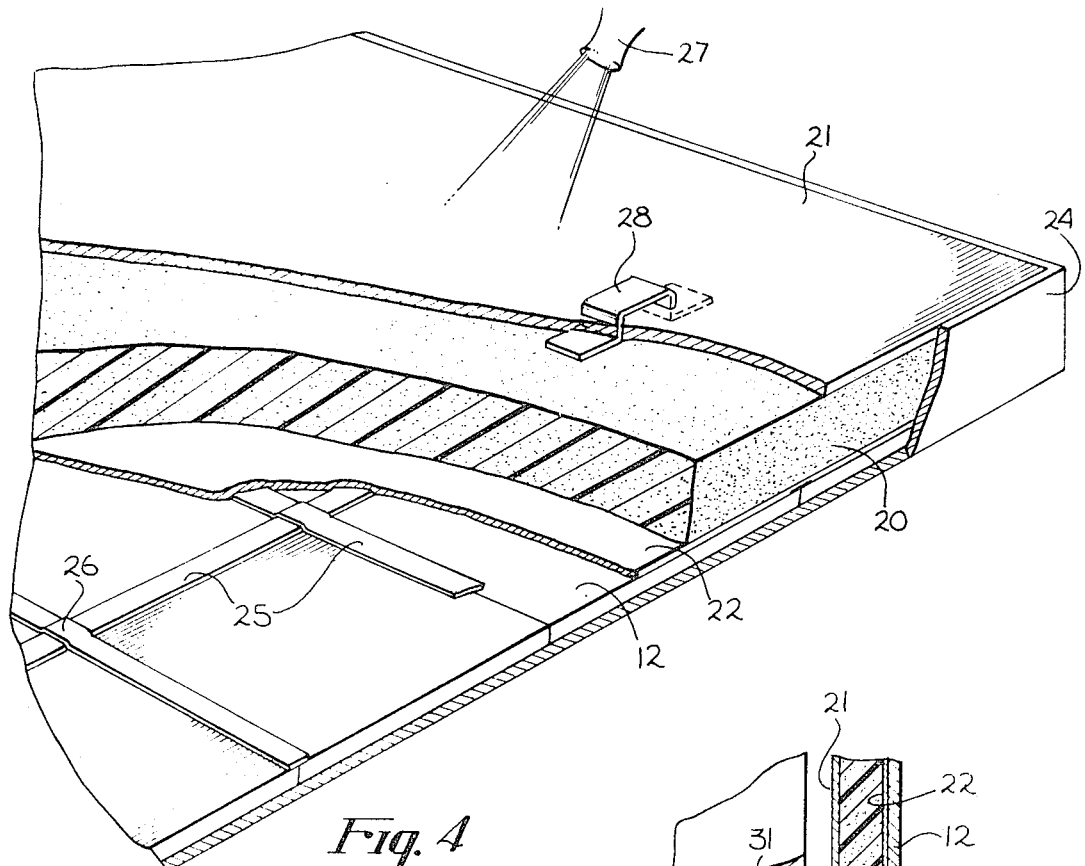
FIG. 4 is a fragmentary perspective view, partially in section, of a wall panel fabricated in accordance with the method of the present invention.

Referring now to FIG. 4, it can be seen that the steps comprising the method of manufacture include the initial placement of tiles into the mold so that the edges of adjacent tiles butt together to form a layer of tiles. Next, lengths of adhesive tape 25 are applied in strips along the adjacent edge marginal regions of the tiles to cover and seal the butt joints. Some strips are laid longitudinally across the tile layer while other strips extend transversely and cross over the first mentioned strips at tile corner locations such as indicated by numeral 26. Next, the fiber glass layer 22 is applied to the tape covered rear surface of the tile layer by such means as spraying, for example. The fiber glass material includes an adhesive or bonding agent such as polyester resins which will effect adherence thereof to the tile layer. Preferably, the fiber glass material is catalyzed exteriorly of the spray gun or applicator so that it is self curing. The fiber glass layer is allowed to set for about 10–15 minutes to complete curing under control of a suitable temperature.

Next, a foam plastic composition is introduced into the cavity over the cured fiber glass layer which, after rising, constitutes core 20. The foam may be sprayed into the cavity and is, preferably, a closed cell foam incorporating desired agents such as fire retardants, for example. The spray gun, as indicated by numeral 27, is passed back and forth as the foam composition is applied in the form of a heavy mist. For mass production, the spray gun may be calibrated to automatically make proper and predetermined passes which provides better cell structure. The foam composition is permitted to cure for approximately 15 minutes.

After curing, the exposed surface of the cellular foam core 20 is sanded for sizing until level and smooth. The top edge of the mold walls may be used as a reference guide for this leveling purpose. Also, a saw, set at a selected level, may be used to size the core surface.

Next, attachment devices 28 are placed on the level surface of the core 20 at selected locations which are critical load bearing and distributing locations. The attachment devices may take form of U-shaped brackets as illustrated or such devices may be apertured straps suitable for securement to the building studs.

The step of attachment device placement is followed by spraying or otherwise applying a fiber glass layer 21 to the exposed core surface which totally covers the surface and adheres thereto. Provision may be made for forming a peripheral edge marginal region about one end of the mold sidewalls to form attachment strips 18, if desired. Portions of the attachment devices are exposed for subsequent panel mounting purposes.

The fabricated panel is a complete unitary structure with all parts and components thereof secured to each other. The fabricated wall panel is permitted to adequately cure for a short period of time at a suitable temperature after which the panel is ready for use. Preferably, relatively thin tiles are employed so that the panel remains lightweight and permits the suspension thereof from the building studs as a unit. Also, if desired, flexible grout may be installed in the cracks between tile on the front or exposed tile layer surface to finish the panel construction.

Figure 5:
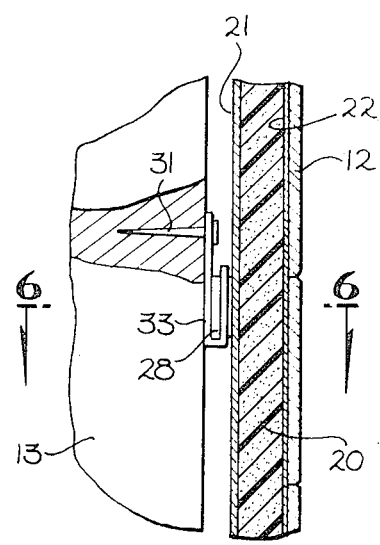
FIG. 5 is a fragmentary sectional view of a wall panel installed to a building stud.
Figure 6:
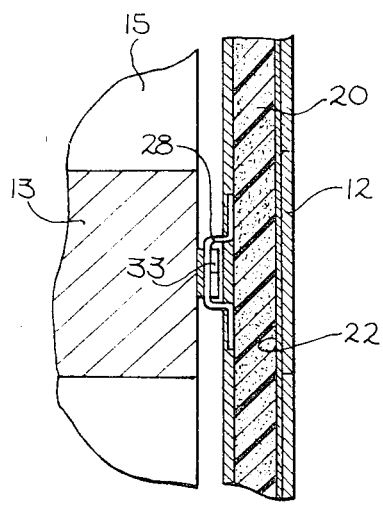
FIG. 6 is a cross sectional view of the wall panel and its securement means as taken in the direction of arrows 6—6 of FIG. 5.

FIGS. 5 and 6 illustrate a wall panel anchoring means which may be particularly employed when access cannot be had to the rear of or behind the supporting studs for the wall panel. One such embodiment includes an upwardly projecting clip 33 secured to a stud by nail 31 which may be suitably received into the exposed socket or receptacle of device 28 provided on the back side of the wall panel. A sufficient number of clip or hanger fasteners may be employed to adequately support the building panel on the studs. As shown in FIGS. 5 and 6, the hook or clip is disposed within the receiver or socket of the hanger carried by the back side of the panel.

Additionally, the back layer 21 may be covered with a self-adhering surface material so that the panel may be secured to one or more studs by the pressure sensitive adhesive. In such an instance, the clip and receptacle would not be used.

Therefore, it can be seen that the wall panel construction of the present invention provides a novel enclosure employing pre-fabricated wall panels which include butt joints which are waterproof and which may be anchored to load-bearing building structural members. The pre-fabricated panels are light-weight and may be readily suspended from the building structural members.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A method of manufacturing non-load bearing wall panels comprising the steps of:

placing a plurality of individual ceramic tiles face down in the bottom of a mold so the adjacent edges of the tiles engage to form a tile layer;

affixing adhesive tape on the exposed surface of the tile layer to cover and seal the joint formed by tile edge engagement;

applying a first fiber reinforced polyester resin material upon the tile layer so as to adhere thereto;

forming a relatively thick core of a plastic foam composition selected from the group consisting of polyethylene, polyurethane and polystyrene upon the first fiber reinforced polyester resin material; and applying a second fiber reinforced polyester resin material upon the exposed surface of the core to serve as backing for the panel.

2. The method as defined in claim 1 wherein the steps of forming the core and applying the second fiber reinforced polyester resin material includes permitting the core to bond to the first and second fiber reinforced polyester resin materials so as to provide a unitary structure.

3. The method as defined in claim 2 including the step of curing the core composition under predetermined temperature for a predetermined period of time.

4. The method as defined in claim 3 wherein said step of forming the core includes spraying a plastic foam composition into the confines of the mold and permitting the composition to expand in situ.

5. The method as defined in claim 4 including the step of leveling the exposed surface of the core preparatory to applying the second fiber reinforced polyester resin material thereon.

6. The method as defined in claim 5 wherein said leveling step is achieved by sanding the exposed surface of the core to a substantially flat and smooth surface.

References Cited

UNITED STATES PATENTS

| | | | |
|---|---|---|---|
| 2,629,899 | 3/1953 | Aller | 264—321 X |
| 2,844,955 | 7/1958 | Talbott | 52—603 X |
| 2,976,573 | 3/1961 | Davis | 264—162 X |
| 3,192,097 | 6/1965 | Abernethy | 52—309 X |
| 3,239,982 | 3/1966 | Nicosia | 264—45 X |
| 3,283,386 | 11/1966 | Cenegy | 264—45 X |
| 3,302,362 | 2/1967 | Lang | 264—45 X |
| 3,476,634 | 11/1969 | Fleischmann | 264—45 X |
| 3,496,058 | 2/1970 | Schroter | 264—45 X |

JULIUS FROME, Primary Examiner

P. A. LEIPOLD, Assistant Examiner

U.S. Cl. X.R.

52—309, 388; 156—78; 264—162, 257, 261, 321